(12) United States Patent
Neudorf et al.

(10) Patent No.: US 8,474,740 B2
(45) Date of Patent: Jul. 2, 2013

(54) BALE PROCESSOR FOR MIXING TWO BALES

(75) Inventors: Blake Neudorf, Vonda (CA); Cameron Wilson, Vonda (CA)

(73) Assignee: Highline Manufacturing Ltd., Vonda, Saskatchewan (CA)

(*) Notice: Subject to any disclaimer, the term of this patent is extended or adjusted under 35 U.S.C. 154(b) by 207 days.

(21) Appl. No.: 12/966,091

(22) Filed: Dec. 13, 2010

(65) Prior Publication Data

US 2011/0139910 A1  Jun. 16, 2011

(30) Foreign Application Priority Data

Dec. 14, 2009 (CA) .................................. 2688590

(51) Int. Cl.
*B02C 23/02* (2006.01)
*B02C 7/00* (2006.01)

(52) U.S. Cl.
USPC .............................. 241/277; 241/280; 241/605

(58) Field of Classification Search
USPC .................. 241/DIG. 605, 277, 280, 605
See application file for complete search history.

(56) References Cited

U.S. PATENT DOCUMENTS

| | | | |
|---|---|---|---|
| 2,561,069 A * | 7/1951 | Peterson | 198/626.6 |
| 3,897,018 A * | 7/1975 | Wilkes et al. | 241/223 |
| 4,597,672 A | 7/1986 | Neier et al. | |
| 4,779,810 A * | 10/1988 | Frey | 241/186.4 |
| 5,033,683 A | 7/1991 | Taylor | |
| 5,217,174 A * | 6/1993 | Martin et al. | 241/222 |
| 5,340,040 A * | 8/1994 | Bussiere et al. | 241/101.761 |
| 5,895,001 A * | 4/1999 | Kuelker et al. | 241/101.76 |
| 6,659,377 B1 * | 12/2003 | Coulter et al. | 241/60 |
| 6,886,763 B2 * | 5/2005 | Lepage et al. | 241/88.4 |
| 7,185,836 B2 * | 3/2007 | Simpson | 241/30 |
| 2002/0195509 A1 | 12/2002 | Lepage et al. | |
| 2007/0138328 A1 * | 6/2007 | Hoovestol | 241/189.1 |
| 2007/0290087 A1 * | 12/2007 | Weiss | 241/101.76 |

* cited by examiner

*Primary Examiner* — Faye Francis
(74) *Attorney, Agent, or Firm* — Dicke, Billig & Czaja, PLLC

(57) ABSTRACT

A bale processor apparatus has a bale chamber configured to hold a front bale in the chamber forward of a rear bale in the chamber. A disintegrator apparatus removes shredded material from the front bale and forms a front stream of shredded material moving laterally, and removes shredded material from the rear bale and forms a rear stream of shredded material. An exhaust opening in the bale chamber adjacent to the front bale is oriented such that the front stream passes laterally through the exhaust opening. A conveyor receives the rear stream and carries same forward and moves same into contact with the front stream such that the rear stream is carried out through the exhaust opening with the front stream.

24 Claims, 4 Drawing Sheets

BALE PROCESSOR FOR MIXING TWO BALES

This invention is in the field of agricultural equipment and in particular a bale processor for mixing two bales.

BACKGROUND

Crop material such as hay, straw and the like is commonly harvested by compacting the material into bales tied with twine. These bales can be small square bales that can be handled by hand, but more commonly now they are large bales that can weigh up to 2000 pounds. These large bales can be rectangular or cylindrical, and when feeding such bales it is common to use a bale processor to remove shredded crop material from the bale with a disintegrator or flail apparatus and then and discharge the shredded material onto the ground or into a feed bunk. Such a bale processor is disclosed for example in U.S. Pat. No. 5,340,040 to Bussiere et al. and in U.S. Pat. No. 5,033,683 to Taylor.

Some double bale processors are configured to carry two of these large bales end to end in the bale processing chamber. An exhaust opening extends along the bottom length of the chamber and shredded material from the bales is discharged laterally out of the bale processor through the opening adjacent to each bale, such that shredded material from the front bale is discharged from the side of the bale processor forward of the material from the rear bale. Such machines allow the shredded material from two different bales to be combined.

The quality of crop material varies significantly, and often has low palatability such that the animals being fed are reluctant to eat it, especially if there is a choice. It is known then to place a low palatability bale and a high palatability bale in a double bale processor, and discharge the two together as described above so that the two qualities of material are mixed, and the palatability of the combination is improved so that both the low and high quality bales are consumed. Similarly it is sometimes desired to combine bales of entirely different crop materials to provide a desired animal ration.

A problem with current double bale processors is that discharging one bale at the front of the machine and discharging the other bale rearward of the front discharge results in a layered combination, rather than a thoroughly mixed combination of crop material. Where the poor quality is layered on top, the animals can pick through the poor material and find the layer of higher quality material under it, eating the higher quality and wasting much of the poorer quality material. Similarly if the higher quality material is on top, the animals simply pick it off and leave the rest. Thoroughly mixing the material would result in improved consumption of the whole combination since it would be much more difficult for the animal to separate it, and would thus reduce waste.

SUMMARY OF THE INVENTION

It is an object of the present invention to provide a bale processing apparatus that overcomes problems in the prior art.

In a first embodiment the present invention provides a bale processor apparatus comprising a bale chamber configured to hold a plurality of bales arranged such that a front bale in the chamber is forward of a rear bale in the chamber. A disintegrator apparatus is operative to remove shredded material from the front bale and form a front stream of shredded material moving laterally, and is operative to remove shredded material from the rear bale and form a rear stream of shredded material. An exhaust opening in the bale chamber adjacent to the front bale is oriented such that the front stream of shredded material passes laterally through the exhaust opening, and a conveyor is operative to receive the rear stream of shredded material and carry the rear stream forward and move the rear stream into contact with the front stream such that the rear stream is carried out through the exhaust opening with the front stream.

In a second embodiment the present invention provides a bale processor apparatus comprising a bale chamber configured to hold a plurality of bales arranged such that a front bale in the chamber is forward of a rear bale in the chamber. A finger rotor with fingers extending therefrom is operative to remove shredded material from the front bale and form a front stream of shredded material moving laterally, and is operative to remove shredded material from the rear bale and form a rear stream of shredded material. An exhaust opening in the bale chamber adjacent to the front bale is oriented such that the front stream of shredded material passes laterally through the exhaust opening, and an auger is operative to receive the rear stream of shredded material and carry the rear stream forward, and a paddle on a front portion of the auger is operative to move the rear stream into contact with the front stream such that the rear stream is carried out through the exhaust opening with the front stream.

In a third embodiment the present invention provides a method of mixing shredded material from different bales. The method comprises configuring a bale processor with a bale chamber to hold a plurality of bales arranged such that a front bale in the chamber is forward of a rear bale in the chamber; operating a disintegrator apparatus to remove shredded material from the front bale and form a front stream of shredded material moving laterally, and to remove shredded material from the rear bale and form a rear stream of shredded material; providing an exhaust opening in the bale chamber adjacent to the front bale and such that the front stream of shredded material passes laterally through the exhaust opening; receiving the rear stream of shredded material in a conveyor and carrying the rear stream forward and moving the rear stream into contact with the front stream such that the rear stream is carried out through the exhaust opening with the front stream.

The present invention thus provides improved mixing of material from two different bales of crop material. Provision is available to vary the ratio of material from each bale in the final mix, and to carry an extra bale where the proportion of one bale material is significantly greater than that of the other.

Hitch weight is reduced and maneuverability is increased by moving the rear wheels supporting the bale processor forward to a location adjacent the rear bale, which is now possible since there is no lateral discharge from the rear bale that would be blocked by the wheels.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
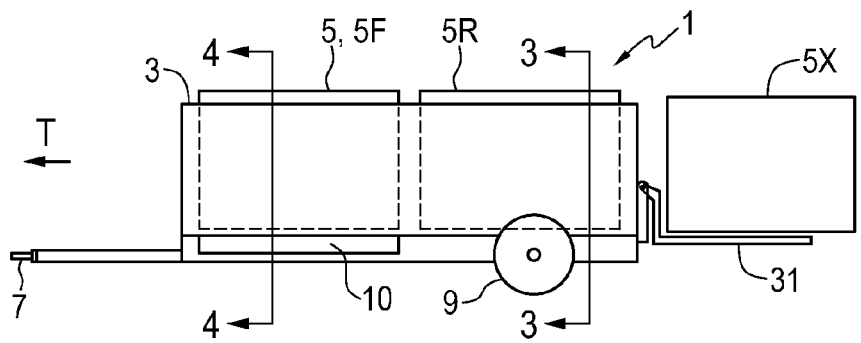
FIG. 1 is a schematic side view of an embodiment of an apparatus of the present invention.
Figure 2:
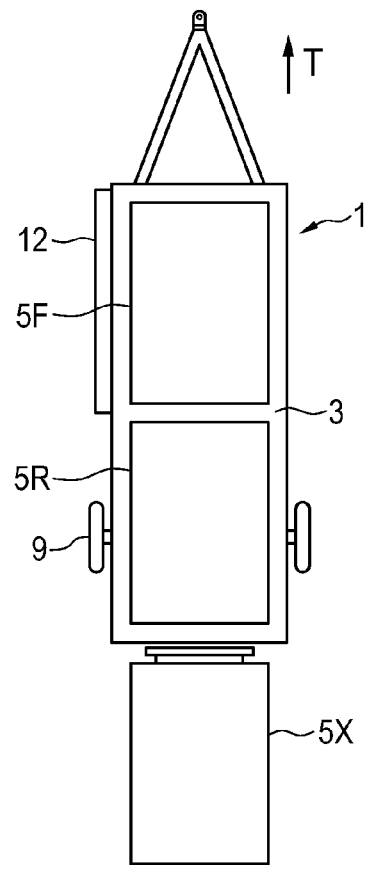
FIG. 2 is a schematic top view of the embodiment of FIG. 1.

FIGS. 1 and 2 schematically illustrate an embodiment of a bale processor apparatus 1 of the present invention. The apparatus 1 comprises a bale chamber 3 configured to hold a plurality of bales 5 arranged such that a front bale 5F in the chamber 3 is forward of a rear bale 5R in the chamber 3. It is contemplated that it may be possible to hold more than two bales in the chamber 3, but the illustrated apparatus 1 simply shows two bales 5 arranged forward and rearward in the chamber 3. The apparatus includes a hitch 7 for attachment to a tractor or like towing vehicle, and wheels 9 supporting the apparatus 1 for movement along the ground in an operating travel direction T.

FIGS. 3-6 schematically illustrate a disintegrator apparatus 11 operative to remove shredded material from the front bale 5F and form a front stream 13F of shredded material moving laterally, and operative to remove shredded material from the rear bale 5R and form a rear stream of shredded material 13R. The disintegrator apparatus 11 is provided by a finger rotor 15 with fingers 17 extending therefrom to remove material from the bales 5 as the rotor 15 rotates at high speed. The fingers 17 can be pivotally attached to the rotor drum 19, acting as flails to remove the material from the bales 5, or can be rigidly attached to the drum 19. In any event the illustrated finger rotor 15 extends along a bottom of the bale chamber 3 and the bales 5 are supported above the finger rotor 15, which rotates at high speed such that the removed shredded material from the bales 5 forms essentially a stream of material 13 moving at high speed as well.

Figure 4:
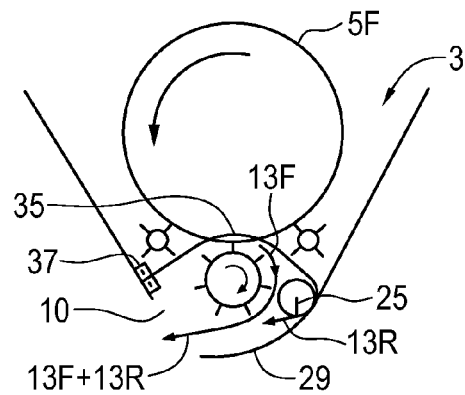
FIG. 4 is a schematic sectional view along line 4-4 in FIG. 1.
Figure 5:
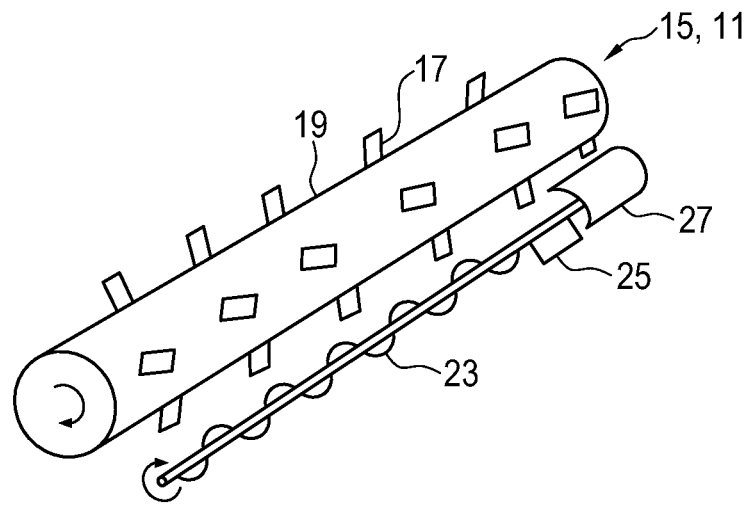
FIG. 5 is a schematic perspective view of the finger rotor and auger of the embodiment of FIG. 1.
Figure 6:
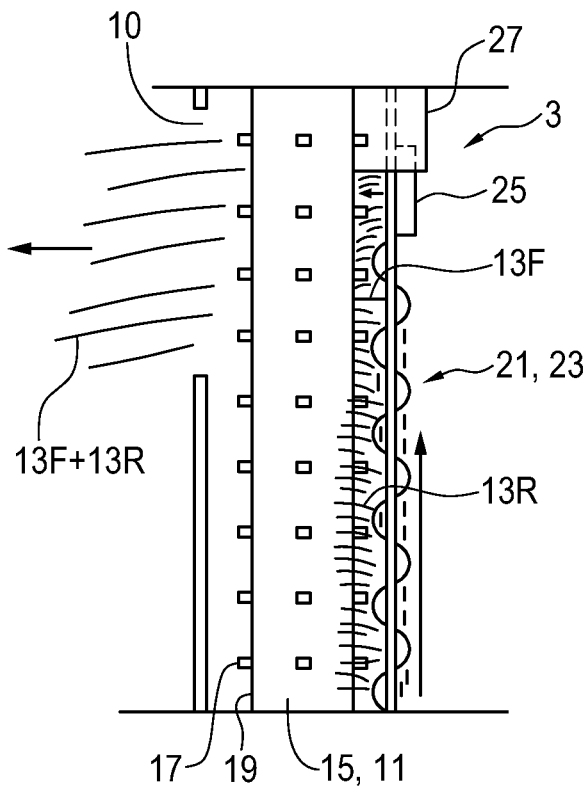
FIG. 6 is a schematic top view of the finger rotor, auger, and exhaust opening of the embodiment of FIG. 1.

An exhaust opening 10 adjacent to the front bale 5F is oriented such that the front stream 13F of shredded material passes laterally through the exhaust opening 10 as can be seen in FIGS. 4 and 6. A chute 12 can be provided on the opening 10.

A conveyor 21 is operative to receive the rear stream 13R of shredded material and carry the rear stream 13R forward and move the rear stream 13R into contact with the front stream 13F such that the rear stream 13R is carried out through the exhaust opening 10 with the front stream 13F.

Figure 3:
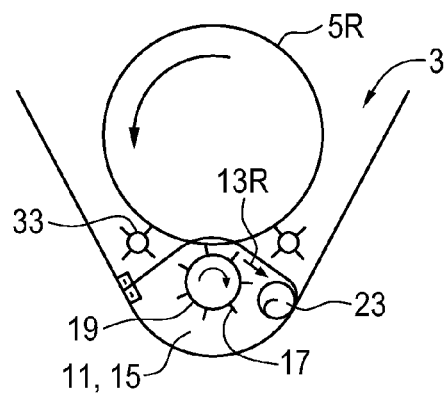
FIG. 3 is a schematic sectional view along line 3-3 in FIG. 1.

In the apparatus illustrated in FIGS. 3-6, the conveyor 21 comprises an auger 23 extending from a rear portion of the bale chamber 3 to a front portion thereof along a side of the finger rotor 15 opposite the exhaust opening 10. The auger 23 is configured to receive the rear stream 13R of shredded material from the finger rotor 15 as schematically illustrated in FIGS. 3 and 6 and to move the rear stream 13F forward. The flighting of the auger 23 ends about at a mid-point of the exhaust opening 10, and a paddle 25 on the forward end of the shaft of the auger 23 is operative to move the rear stream 13R into contact with the fast moving front stream 13F that is coming of the finger rotor 15, such that the rear stream 13R is carried out through the exhaust opening 10 with the front stream 13F.

Thus material is pulled off of the rear bale 5R by the top of the side of the finger rotor 15 and is thrown in a stream, rear stream 13F as shown in FIG. 3, at the auger 23. The auger 23 drags the stream of material towards the front to the paddle 25. At the front of the bale chamber 3 material is pulled off the front bale by the top of the side of the finger rotor 15 and is thrown in a stream, front stream 13R as shown in FIG. 4, also at the flighting of auger 23, or at the paddle 25, or the cover 27 that covers the front end of the auger 23. Since the auger is essentially filled with the material from the rear stream 13R, the finger rotor 15 carries the front stream 13F, or at least the greater part of the front stream 13F, around between the auger 23 and the finger rotor 15 and out the exhaust opening 10 as shown in FIG. 4.

Because the auger 23, paddle 25, and chamber floor 29 are as seen in FIG. 4, generally in the tangential path of the front stream 13F thrown from the front bale 5F, the material from the rear stream 13R is dragged under the finger rotor with the front stream 13F, and the combination of the material from the front and rear bales is thrown out through the exhaust opening 10 in a stream 13F+13R that is mixed to a greater extent than in the prior art.

The volume of the front stream 13F of shredded material relative to the volume of the rear stream 13R of shredded material can be adjusted to vary the relative content of the front and rear bales 5F, 5R in the combination stream 13F+13R such that more or less of each type of bale material can be in the mixture being fed. Conveniently the volumes are adjusted by adjusting a removal rate of removing shredded material from the front bale 5F relative to the rear bale 5R. The removal rate from the rear bale 5F could be adjusted to be substantially twice the removal rate from the front bale 5R, such that two rear bales would be shredded for each front bale. The illustrated apparatus 1 therefore comprises a transport mechanism, such as rear extending forks 31, operative to carry an external bale 5X at a location external to the bale chamber 3, and operative to move the external bale 5X up and into the bale chamber 3 in the location the rear bale 5R. Thus in one trip from the bale source to the feeding location the apparatus 1 could mix the shredded material from one front bale 5F with the shredded material from two rear bales 5R.

In the apparatus 1, the bales 5 are supported above the finger rotor 15 on right and left manipulator rollers 33 extending from a rear end of the bale chamber 3 to a front end thereof above and on either side of the finger rotor 15, and on guard rods 35 extending laterally above the finger rotor 15 at a vertical location below top edges of the manipulator rollers 33. The fingers 17 of the finger rotor 17 pass between the guard rods 35 to contact the bales 5 and remove material therefrom. The finger guards 35 are adjustably mounted to the walls of the bale chamber 3 by adjustment mechanism 37 so the guard rods 35 can move up and down with respect to the finger rotor 15. The lower the guard rods, the closer the bale 5 is to the drum 19 of the finger rotor 15, and the farther the fingers 17 extend into the bale, such that the lower the bale the greater the removal rate of material from the bale.

Thus the volume of the front stream 13F of shredded material relative to the volume of the rear stream 13R of shredded material can be adjusted by moving the guard rods 35 supporting one of the bales 5F, 5R up and down relative to the guard rods 35 supporting the other of the bales 5F, 5R to vary a removal rate of removing shredded material from the front bale 5F relative to the rear bale 5R.

Providing an exhaust opening 10 only at the front end of the apparatus 1 also allows the wheels 9 to be located rearward of the exhaust opening 10 and beside a rear bale location in the bale chamber 3. In a conventional bale processor the exhaust opening extends the full length of the bale chamber 3, and the front and rear streams 13F, 13R of shredded material both simply discharge laterally out the side. The wheels supporting a conventional bale processor must then be located rearward of the rear bale location so that the rear stream can discharge without interference from the wheel. This rear location means the towing vehicle at the hitch must support a significant portion of the weight of the bale processor.

With the illustrated apparatus 1 however, the wheels 9 can be moved well forward and such that a much greater proportion of the weight of the apparatus 1 is carried on the wheels 9, and less on the hitch 7. Further, those skilled in the art will recognize that reducing the distance between the wheels 9 and the hitch 7 significantly increases the maneuverability of the apparatus 1.

Figure 7:
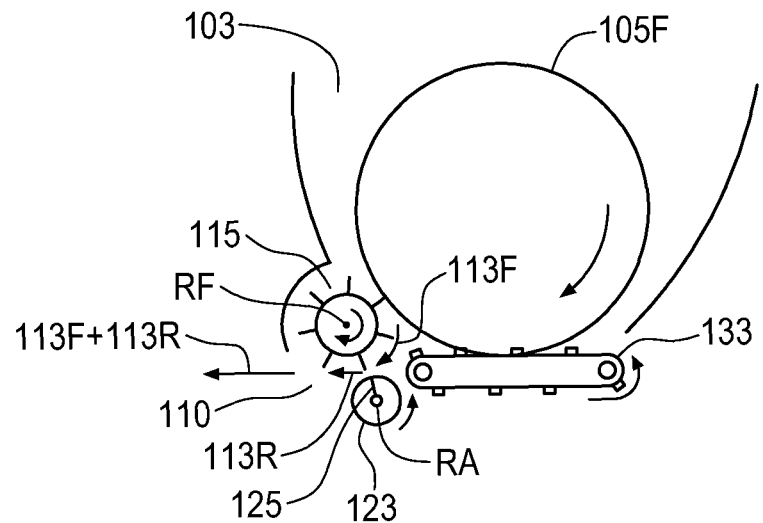
FIG. 7 is a schematic sectional view of an alternate embodiment of an apparatus of the present invention, along line 7-7 in FIG. 8.
Figure 8:
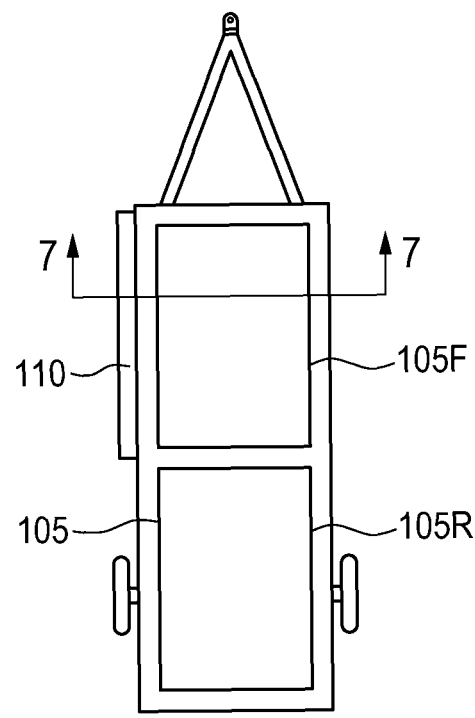
FIG. 8 is a schematic top view of an alternate embodiment of an apparatus of the present invention.

FIGS. 7 and 8 schematically illustrate an alternate embodiment of an apparatus of the present invention where the disintegrating finger rotor 115 extends along a bottom side of the bale chamber 103 and wherein the bales 105 are supported beside the finger rotor 115 on the bed of a slat conveyor 133, such as is also known in the art. The slat conveyor 133 moves the bottom side of the bales 105 toward the finger rotor 115, and the finger rotor 115 removes shredded material as described above from front and rear bales 105F, 105R. The auger 123 is located below the finger rotor 115, and is shown oriented such that a rotational axis RA of the auger 123 is located toward bales 105, relative to a rotational axis RF of the finger rotor 115 such that the rear stream 113R removed from the rear bale is directed into the auger 123 and is carried forward in the auger 123 and pushed away from the auger 123 by the paddle 125 at the front end of the auger 123. The rear stream 113R is moving again substantially tangential to the finger rotor 115 and mixes with the front stream 113F and discharges through the exhaust opening 110.

Figure 9:
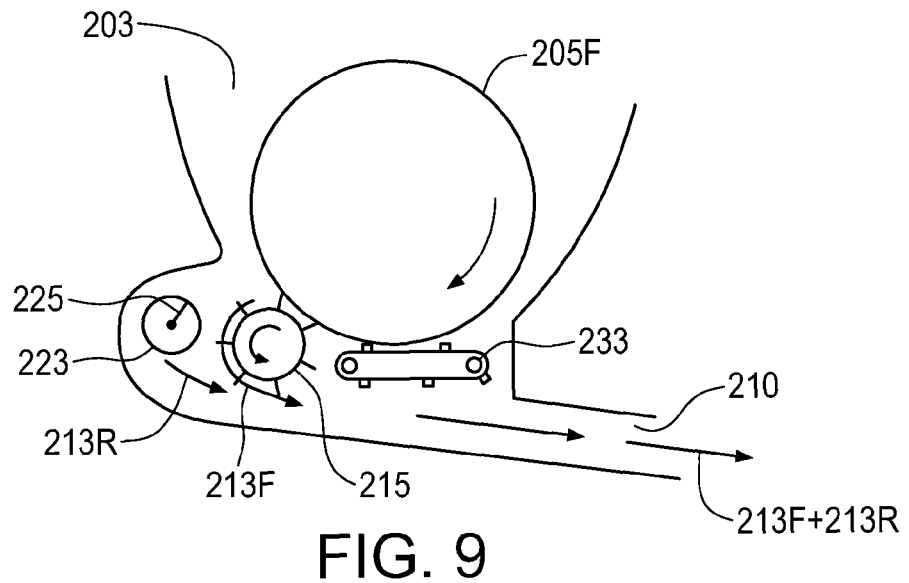
FIG. 9 is a schematic sectional view of a further alternate embodiment of an apparatus of the present invention, along line 9-9 in FIG. 10.
Figure 10:
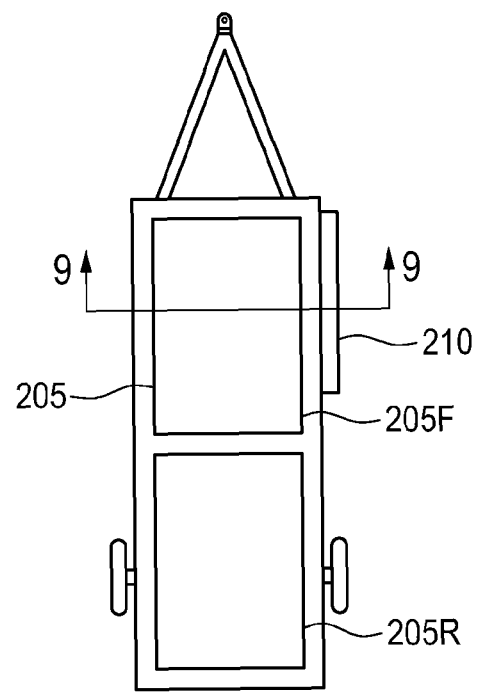
FIG. 10 is a schematic top view of an alternate embodiment of an apparatus of the present invention.

FIGS. 9 and 10 schematically illustrate a further alternate embodiment of an apparatus of the present invention where the disintegrating finger rotor 215 extends along a bottom side of the bale chamber 203 and wherein the bales 205 are supported beside the finger rotor 215 on the bed of a slat conveyor 233, such as is also known in the art. The slat conveyor 233 moves the bottom side of the bales 205 toward the finger rotor 215, and the finger rotor 215 removes shredded material as described above from front and rear bales 205F, 205R. The auger 223 is located generally beside the finger rotor 215 such that the rear stream 213R removed from the rear bale is directed into the auger 223 and is carried forward in the auger 223 and pushed away from the auger 223 by the paddle 225 at the front end of the auger 223. The rear stream 213R is moving again substantially tangential to the finger rotor 215 and mixes with the front stream 213F and discharges through the exhaust opening 210.

It is contemplated that other configurations could also be used to carry the material removed from one bale to a discharge location of material from a different bale. The invention thus provides a method of mixing shredded material from different bales. The method comprises configuring a bale processor with a bale chamber 3 to hold a plurality of bales arranged such that a front bale 5F in the chamber 3 is forward of a rear bale 5R, in the chamber; operating a disintegrator apparatus 11, 15 to remove shredded material from the front bale 5F and form a front stream 13F of shredded material moving laterally, and to remove shredded material from the rear bale 5R and form a rear stream 13R of shredded material; providing an exhaust opening 10 adjacent to the front bale 5F and such that the front stream 13F of shredded material passes laterally through the exhaust opening 10 receiving the rear stream 13R of shredded material in a conveyor 21, 23 and carrying the rear stream 13R forward and moving the rear stream 13R into contact with the front stream 13F such that the rear stream 13R is carried out through the exhaust opening with the front stream 13F.

The ratio of one bale material to the other can be varied by adjusting a volume of the front stream 13F of shredded material relative to a volume of the rear stream 13R of shredded material, conveniently by adjusting a removal rate of removing shredded material from the front bale 13F relative to the rear bale 13R.

The hitch weight of the bale processor is reduced and maneuverability of the bale processor is increased by supporting the bale processor on wheels 9 located rearward of the exhaust opening 10 and beside a rear bale location in the bale chamber 3.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A bale processor apparatus comprising:
   a bale chamber configured to hold a plurality of bales arranged such that a front bale in the chamber is forward of a rear bale in the chamber;
   a disintegrator apparatus operative to remove material from the front bale and form a front stream of shredded material moving laterally, and operative to remove material from the rear bale and form a rear stream of shredded material;
   an exhaust opening in the bale chamber adjacent to the front bale and oriented such that the front stream of shredded material passes laterally through the exhaust opening;
   a conveyor operative to receive the rear stream of shredded material and carry the rear stream forward and move the rear stream into contact with the front stream such that the rear stream is carried out through the exhaust opening with the front stream.

2. The apparatus of claim 1 wherein a volume of the front stream of shredded material relative to a volume of the rear stream of shredded material can be adjusted.

3. The apparatus of claim 2 wherein the volumes are adjusted by adjusting a removal rate of removing shredded material from the front bale relative to the rear bale.

4. The apparatus of claim 3 wherein the removal rate from one of the front and rear bales can be adjusted to be substantially twice the removal rate from the other of the front and rear bales, and wherein the apparatus comprises a transport mechanism operative to carry an external bale at a location external to the bale chamber, and operative to move the external bale into the bale chamber in a location of the one of the front and rear bales where the removal rate is twice the removal rate from the other bale.

5. The apparatus of claim 1 wherein the conveyor comprises an auger extending from a rear portion of the bale chamber to a front portion thereof, the auger configured to receive the rear stream of shredded material and to move the rear stream, and a paddle on a forward end of the auger operative to move the rear stream into contact with the front stream.

6. The apparatus of claim 5 wherein the disintegrator apparatus comprises a finger rotor with fingers extending therefrom to remove material from the bales, the finger rotor extending along a bottom of the bale chamber and wherein the bales are supported above the finger rotor.

7. The apparatus of claim 6 wherein the exhaust opening is located on a first side of the finger rotor, and wherein the auger extends along an opposite second side of the finger rotor.

8. The apparatus of claim 7 wherein the bales are supported above the finger rotor on right and left manipulator rollers extending from a rear end of the bale chamber to a front end thereof above and on either side of the finger rotor, and on guard rods extending laterally above the finger rotor at a vertical location below top edges of the manipulator rollers.

9. The apparatus of claim 8 wherein a volume of the front stream of shredded material relative to a volume of the rear stream of shredded material can be adjusted by moving guard rods supporting one of the bales up and down relative to the guard rods supporting the other of the bales to vary a removal rate of removing shredded material from the front bale relative to the rear bale.

10. The apparatus of claim 9 wherein the removal rate from the rear bale can be adjusted to be substantially twice the removal rate from the front bale, and wherein the apparatus comprises transport forks extending rearward from the bale chamber and operative to carry an external bale, and operative to move the external bale into the bale chamber in a location of the rear bale.

11. The apparatus of claim 5 wherein the disintegrator apparatus comprises a finger rotor extending along a bottom side of the bale chamber and wherein the bales are supported beside the finger rotor.

12. The apparatus of claim 10 wherein the bales are supported beside the finger rotor on a conveyor bed operative to move a bottom side of the bales toward the finger rotor.

13. The apparatus of claim 11 wherein the auger is located below the finger rotor, and wherein a rotational axis of the auger is located toward the bales, relative to a rotational axis of the finger rotor.

14. The apparatus of claim 1 wherein the bale chamber is supported on wheels located rearward of the exhaust opening and beside a rear bale location in the bale chamber.

15. A bale processor apparatus comprising:
a bale chamber configured to hold a plurality of bales arranged such that a front bale in the chamber is forward of a rear bale in the chamber;
a finger rotor with fingers extending therefrom and operative to remove material from the front bale and form a front stream of shredded material moving laterally, and operative to remove material from the rear bale and form a rear stream of shredded material;
an exhaust opening in the bale chamber adjacent to the front bale and oriented such that the front stream of shredded material passes laterally through the exhaust opening;
an auger operative to receive the rear stream of shredded material and carry the rear stream forward and a paddle on a front portion of the auger and operative to move the rear stream into contact with the front stream such that the rear stream is carried out through the exhaust opening with the front stream.

16. The apparatus of claim 15 wherein the finger rotor extends along a bottom of the bale chamber and wherein the bales are supported above the finger rotor on right and left manipulator rollers extending from a rear end of the bale chamber to a front end thereof above and on either side of the finger rotor, and on guard rods extending laterally above the finger rotor at a vertical location below top edges of the manipulator rollers.

17. The apparatus of claim 16 wherein the exhaust opening is located on a first side of the finger rotor, and wherein the auger extends along an opposite second side of the finger rotor.

18. The apparatus of claim 17 wherein the bales are supported above the finger rotor on right and left manipulator rollers extending from a rear end of the bale chamber to a front end thereof above and on either side of the finger rotor, and on guard rods extending laterally above the finger rotor at a vertical location below top edges of the manipulator rollers.

19. The apparatus of claim 18 wherein a volume of the front stream of shredded material relative to a volume of the rear stream of shredded material can be adjusted by moving guard rods supporting one of the bales up and down relative to the guard rods supporting the other of the bales to vary a removal rate of removing shredded material from the front bale relative to the rear bale.

20. The apparatus of claim 19 wherein the removal rate from the rear bale can be adjusted to be substantially twice the removal rate from the front bale, and wherein the apparatus comprises transport forks extending rearward from the bale chamber and operative to carry an external bale, and operative to move the external bale into the bale chamber in a location of the rear bale.

21. The apparatus of claim 15 wherein the disintegrator apparatus comprises a finger rotor extending along a bottom side of the bale chamber and wherein the bales are supported beside the finger rotor.

22. The apparatus of claim 20 wherein the bales are supported beside the finger rotor on a conveyor bed operative to move a bottom side of the bales toward the finger rotor.

23. The apparatus of claim 21 wherein the auger is located below the finger rotor, and wherein a rotational axis of the auger is located toward the bales, relative to a rotational axis of the finger rotor.

24. The apparatus of claim 15 wherein the bale chamber is supported on wheels located rearward of the exhaust opening and beside a rear bale location in the bale chamber.

* * * * *